(12) United States Patent
Seger et al.

(10) Patent No.: US 10,822,175 B2
(45) Date of Patent: Nov. 3, 2020

(54) DEVICE AND METHOD FOR BUFFERING PIECE GOODS

(71) Applicant: Krones AG, Neutraubling (DE)

(72) Inventors: Martin Seger, Neumerkt (DE); Matthias Wahl, Langquaid (DE); Michael Jogsch, Barbing (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 16/514,851

(22) Filed: Jul. 17, 2019

(65) Prior Publication Data

US 2020/0024079 A1   Jan. 23, 2020

(30) Foreign Application Priority Data

Jul. 17, 2018 (DE) .................. 10 2018 211 859

(51) Int. Cl.
  *B65G 47/08* (2006.01)
  *B65G 47/82* (2006.01)

(52) U.S. Cl.
  CPC .............. *B65G 47/08* (2013.01); *B65G 47/82* (2013.01); *B65G 2201/0244* (2013.01)

(58) Field of Classification Search
  CPC ..... B65G 47/08; B65G 47/082; B65G 47/084
  USPC ................. 198/429, 430, 432, 728, 729
  See application file for complete search history.

(56) References Cited

U.S. PATENT DOCUMENTS

| 4,768,642 A * | 9/1988 | Hunter | B65G 47/082 198/419.2 |
| 6,808,061 B2 * | 10/2004 | Dennert | B65G 47/082 198/430 |
| 7,416,072 B2 * | 8/2008 | Gosset | B65G 47/715 198/429 |
| 9,950,875 B2 * | 4/2018 | Walter | B65G 47/715 |
| 2004/0195074 A1 * | 10/2004 | Iwasa | B65B 35/40 198/431 |
| 2006/0060448 A1 * | 3/2006 | Gosset | B65G 47/841 198/373 |
| 2014/0076692 A1 * | 3/2014 | van de Loecht | B65G 47/82 198/606 |
| 2014/0083817 A1 * | 3/2014 | van de Loecht | B65G 47/841 198/459.8 |
| 2015/0291367 A1 * | 10/2015 | Petrovic | B65G 47/5113 198/347.1 |
| 2016/0244271 A1 * | 8/2016 | Walter | B65G 47/715 |
| 2016/0362208 A1 * | 12/2016 | Papsdorf | B65G 47/32 |
| 2016/0362256 A1 * | 12/2016 | Papsdorf | B65G 47/32 |
| 2017/0369254 A1 * | 12/2017 | Muller | B65G 47/32 |

(Continued)

FOREIGN PATENT DOCUMENTS

| DE | 20306926 U1 | 8/2004 |
| DE | 102008040204 A1 | 1/2010 |
| DE | 102011075178 A1 | 11/2012 |

(Continued)

*Primary Examiner* — Joseph A Dillon, Jr.
(74) *Attorney, Agent, or Firm* — McCoy Russell LLP

(57) ABSTRACT

The disclosure relates to a buffer device and a method for buffering piece goods, in particular containers, bottles or packages, with a buffer area, a feed device for supplying piece goods to the buffer area, a discharge device for discharging piece goods from the buffer area. The device additionally comprises several circulating, independently drivable row pushers which can transport the piece goods in the direction of transport through the buffer area.

17 Claims, 7 Drawing Sheets

(56) References Cited

U.S. PATENT DOCUMENTS

2019/0100387 A1* 4/2019 Hayashi ................. B65B 59/02

FOREIGN PATENT DOCUMENTS

| DE | 202016101207 U1 | 7/2017 |
|---|---|---|
| EP | 2500296 A1 | 9/2012 |
| EP | 3461764 A1 | 4/2019 |
| JP | H069034 A | 1/1994 |
| WO | 2014076390 A1 | 5/2014 |
| WO | 2016102117 A1 | 6/2016 |
| WO | 2016200748 A1 | 12/2016 |
| WO | 2017140992 A1 | 8/2017 |
| WO | 2018184931 A1 | 10/2018 |

* cited by examiner

DEVICE AND METHOD FOR BUFFERING PIECE GOODS

CROSS REFERENCE TO RELATED APPLICATIONS

The present application claims priority to German Patent Application No. 10 2018 211 859.0, entitled "DEVICE AND METHOD FOR BUFFERING PIECE GOOD", and filed on Jul. 17, 2018. The entire contents of the above-listed application is hereby incorporated by reference for all purposes.

TECHNICAL FIELD

The disclosure relates to a buffer device and a method for buffering piece goods, in particular containers, bottles or packages.

BACKGROUND AND SUMMARY

In the field of beverage technology, in particular in the field of block and transport technology, buffers, which hold back and buffer a number of piece goods to be forwarded to a downstream machine only later, are already known.

A corresponding buffer device is already known from EP 2 920 093 B1.

In the known buffer device, the articles are placed on the buffer area by way of robotic manipulators.

The use of robotic manipulators is costly and, in addition, the known system entails drawbacks in clocking a certain number of rows or lines, respectively, which must be matched to the number of lanes of a downstream packer. A change or removal of baffles can then become necessary.

Based on this, the object of the present disclosure is to provide a buffer device and a corresponding method which make it possible to move a number of respective buffer rows or lines as needed out of the buffer area, where the device can be implemented both in a simple and inexpensive manner The buffer device for piece goods according to the disclosure, in particular for containers, bottles or packages, comprises a buffer area, a feed device, e.g. a feed conveyor belt for supplying piece goods to the buffer area, and a discharge device, e.g. a discharge conveyor belt for discharging the piece goods from the buffer area. According to the disclosure, the buffer device further comprises several circulating, independently drivable row pushers which can push the piece goods onto and over the buffer area. The piece goods can be supplied to the buffer area line by line by the respective independently drivable row pushers, and a number of buffer lines as needed can be moved out of the buffer area. This means, for example, that a lane of articles can be transported to the buffer area, but e.g., two lanes can be discharged downstream of the buffer area to feed the piece goods to two machines, e.g. two lines of piece goods can be pushed by respective row pusher onto the discharge device such that they lie parallel to each other on the discharge device. The lines can then be separated again and fed as two product lanes to respective machines.

Due to the fact that the row pushers can be driven independently of one another, e.g. free spaces on the buffer area can easily be crossed. If the free space has been completely crossed, for example, the motion of the respective row pusher can then be slowed down again and finally adapted to the outlet situation. Due to the independently drivable and freely programmable drives of the row pushers, all distances between the row pushers are adjustable by software, so that, for example, no conversion is necessary with a product change. In addition, it is possible to react to current conditions and to push out an amount as needed from the buffer area. If one row pusher is arranged between each line of piece goods or group of piece goods, respectively, then the number of piece goods pushed out from the buffer area can be controlled particularly well and easily. In addition, the distances of the rows are adjustable relative to each other, which enables space-optimized actuation.

It is particularly advantageous to have the row pushers be drivable by several independent drives, so that the speed of the row pusher scan be adapted individually. For this purpose, for example, a longitudinal stator drive can be provided, or the row pushers can be driven by way of disengageable transport chains. It is also possible to have each row pusher comprise a separate electric drive motor.

The buffer area can be designed as a static buffer table or as a conveyor belt moving in the direction of transport T.

According to the present disclosure, it is advantageously possible that several successive row pushers push the piece goods in a direction of transport from the end of the buffer area facing the feed device to an end of the buffer area facing the discharge device, in particular, the buffer device comprises more than 10, advantageously more than 15, and particularly advantageously more than 30 circulating row pushers.

According to an embodiment, the orbit of the pushers is arranged above the buffer area. The respective row pusher can then move in the direction of transport transverse to the feed device over the buffer area and then at the end of the buffer area and the discharge device move back to an inlet region.

According to another embodiment, a row pusher has a width b that corresponds substantially to the width of the buffer area, where substantially the same width means that the width of the row pusher differs, i.e. is smaller, by at most by 1 to 5% of the width of the buffer area or by twice half of the article diameter. It can thus be ensured that all piece goods are reliably engaged by the pusher, and optionally further guided by a side guide on the buffer area.

According to an embodiment, a row pusher comprises several pusher modules arranged in a direction transverse to the direction of transport T, which then only have a width which corresponds to a partial width of the width of the buffer area. Optionally, these pusher modules as well are driven independently, which entails an even greater range of variation in the push out and an even more selective discharge of the piece goods from the buffer area because not always an entire line must be pushed out, but selectively only a certain number of piece goods can be discharged.

According to an embodiment, the buffer device comprises a deflection device, such as a switch, upstream of the inlet region on the buffer area (where the inlet region of the feed device adjoins the end of the buffer area), where other deflection devices, which deflect the lane of piece goods fed by the feed device such that a certain number of successive piece goods have a sawtooth shape, are also conceivable. In this case, the lane of articles supplied can be formed by one row of articles or by several rows in parallel. If a synchronized row pusher is then controlled to the tip of the incoming sawtooth-shaped group and then follows the sawtooth in the direction of the buffer area, it is achieved that the row pusher can be retracted between the individual sawtooth-shaped lines or groups without needing to interrupt the flow of piece goods arriving from the switch.

According to one embodiment, the discharge device comprises at least two discharge belts, where at least one line of piece goods can be pushed from the buffer area onto a first discharge belt and, in the event of several lines juxtaposed on the first discharge belt, the flow of articles can be split into two lanes by way of a distribution device ono the at least two discharge belts, or the discharge device comprises two juxtaposed discharge belts and the line of piece goods can be pushed onto one or the other discharge belt by the row pusher or a row pusher module.

It is also possible for the flows of articles to be conveyed further in the direction of transport T downstream of the buffer area, and optionally to be rotated by 90° in a guided manner In the method according to the disclosure for buffering piece goods, in particular, containers, bottles or packages, the piece goods are conveyed via a feed device to a buffer area and pushed by independently drivable row pushers in the direction of transport through the buffer area and to a discharge device.

The piece goods can therefore be pushed by the row pushers onto the buffer area and also be pushed from the buffer area onto the discharge device. If the buffer area itself does not move, then the row pushers can push the piece goods on the buffer area in the direction of discharge device. If the buffer area is configured as a conveyor belt that is movable in the direction of transport, then the row pusher can move at the same speed and thus support the piece goods. If the row pusher moves faster than the conveyor belt, then the row pusher can move the piece goods on the buffer area in the direction of transport due to the relative speed.

Advantageously, the row pusher can insert a certain number of piece goods line by line onto the buffer area.

Advantageously, the row pushers scan at least temporarily be driven at different speeds, so that the distance between two successive row pushers changes. The piece goods can then be selectively buffered and pushed out as needed. Free spaces at the center of the buffer area can therefore also be crossed in a simple manner. The speed of a row pusher when circulating along an orbit may vary, so that the speed can be selectively adapted to different conditions when entering, conveying over the buffer area, pushing out and quickly returning to the initial position without affecting the other row pushers.

It is advantageously provided upstream of the entry to the buffer area that a certain number of articles are made to assume a sawtooth shape, where the sawtooth shape has a tip and two sections converging at a flat angle $\alpha$. The angle $\alpha$ is, for example, in a range of 1.5° to 10°. When the piece goods enter the inlet area, i.e. an area of the conveyor device upstream of the buffer area, a row pusher entering in the direction of transport moves and first engages at the leading section of the sawtooth-shaped articles which extends substantially parallel to the front surface of the row pusher. The row pusher guides this portion along in the direction of transport, while the piece goods of the trailing portion, which extends at an acute angle to the front area of the row pusher, gradually move in front of the row pushers until the articles of one line lie in front of the row pusher, and the row pusher pushes the section onto the buffer area.

The piece goods and the row pushers can then enter without a row pusher or the feed device needing to be stopped. This enables a continuous operation.

Advantageously, the row pushers move in an orbit above the buffer area and are optionally guided on both sides, i.e. to the left and the right of the buffer area.

It is indeed possible that the piece goods are fed in one lane of piece goods which can have one or more rows and a distribution device is provided downstream of the buffer table and splits the piece goods in two or more lanes for discharging them to two or more machines.

It is possible that two or more lines arranged in parallel in the direction of transport are pushed by two or more row pushers onto the discharge device and then split by a distribution device into two or more lanes of piece goods or only one line is pushed by a row pusher onto the discharge device (5) and one lane of piece goods is discharged.

The method can then be customized to specific requirements.

The present disclosure shall be explained below in more detail with reference to the following figures.

DETAILED DESCRIPTION

Figure 1:
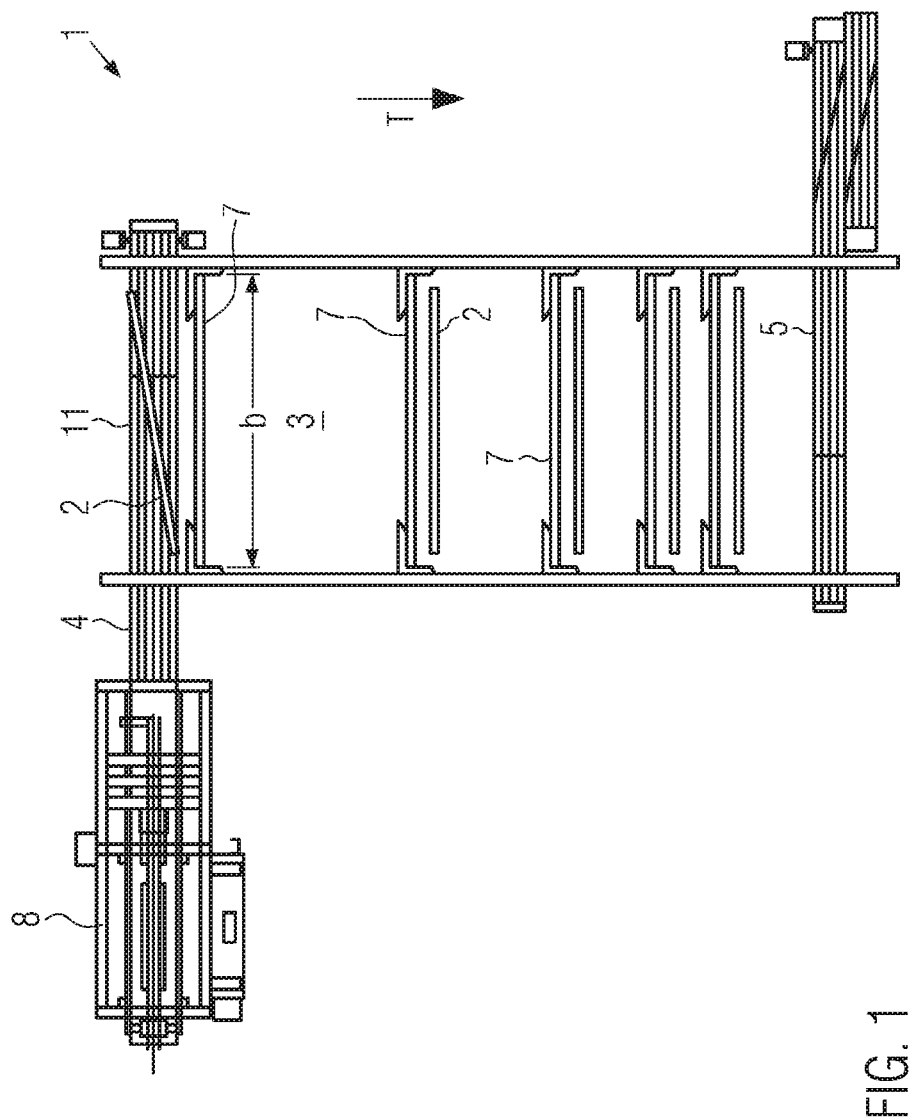
FIG. 1 shows a rough schematic top view onto an embodiment of a buffer device according to the present disclosure.
Figure 8A:
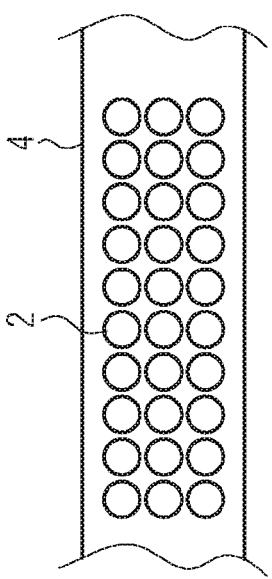
FIGS. 8A and 8B show a single row and a multi-row lane of piece goods, respectively.
Figure 8B:
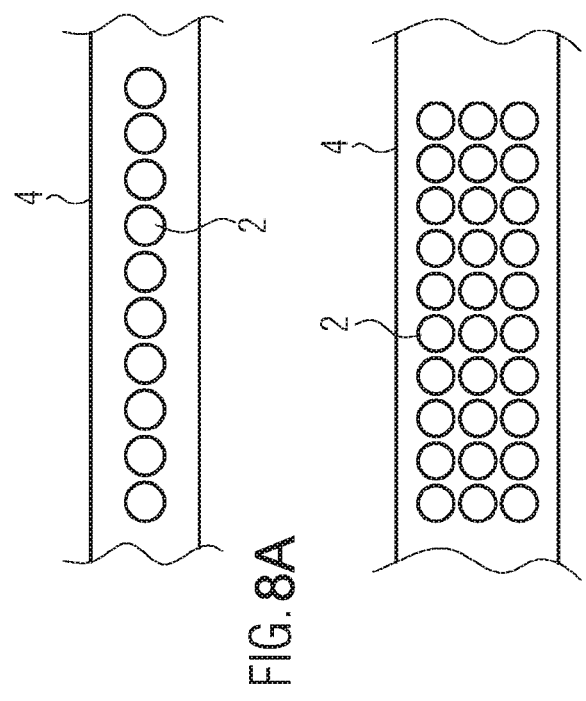

FIG. 1 shows a top view onto an embodiment of a buffer device according to the present disclosure. The device comprises a feed device 4 for supplying piece goods, such as containers, bottles or packages. The feed device may be designed as a circulating conveyor belt. Feed device 4 extends into an inlet region 11 which adjoins the rear end of a buffer area 3. Arranged at the opposite end of buffer area 3 is discharge device 5, which is in particular also configured as a circulating conveyor belt. In this embodiment, feed device 4 as well as discharge device 5 extend in a direction perpendicular to the direction of transport T in which the piece goods are moved through buffer area 3. The piece goods are transported in on feed device 4 in a lane of piece goods, which can be formed as a single row, but also several piece goods can be transported juxtaposed in one lane, as shown for example in FIGS. 8A and 8B.

A certain number of piece goods in inlet region 11 can be engaged by a row pusher 7 and pushed as a line onto buffer area 3.

For this purpose, buffer device 1 comprises several circulating, independently drivable row pushers 7. Row pushers 7 have a width b which corresponds substantially to the width of buffer area 3, or is only slightly, 1% to 5% smaller, in order to push the piece goods line by line from inlet region 11 and over buffer area 3.

Figure 2:
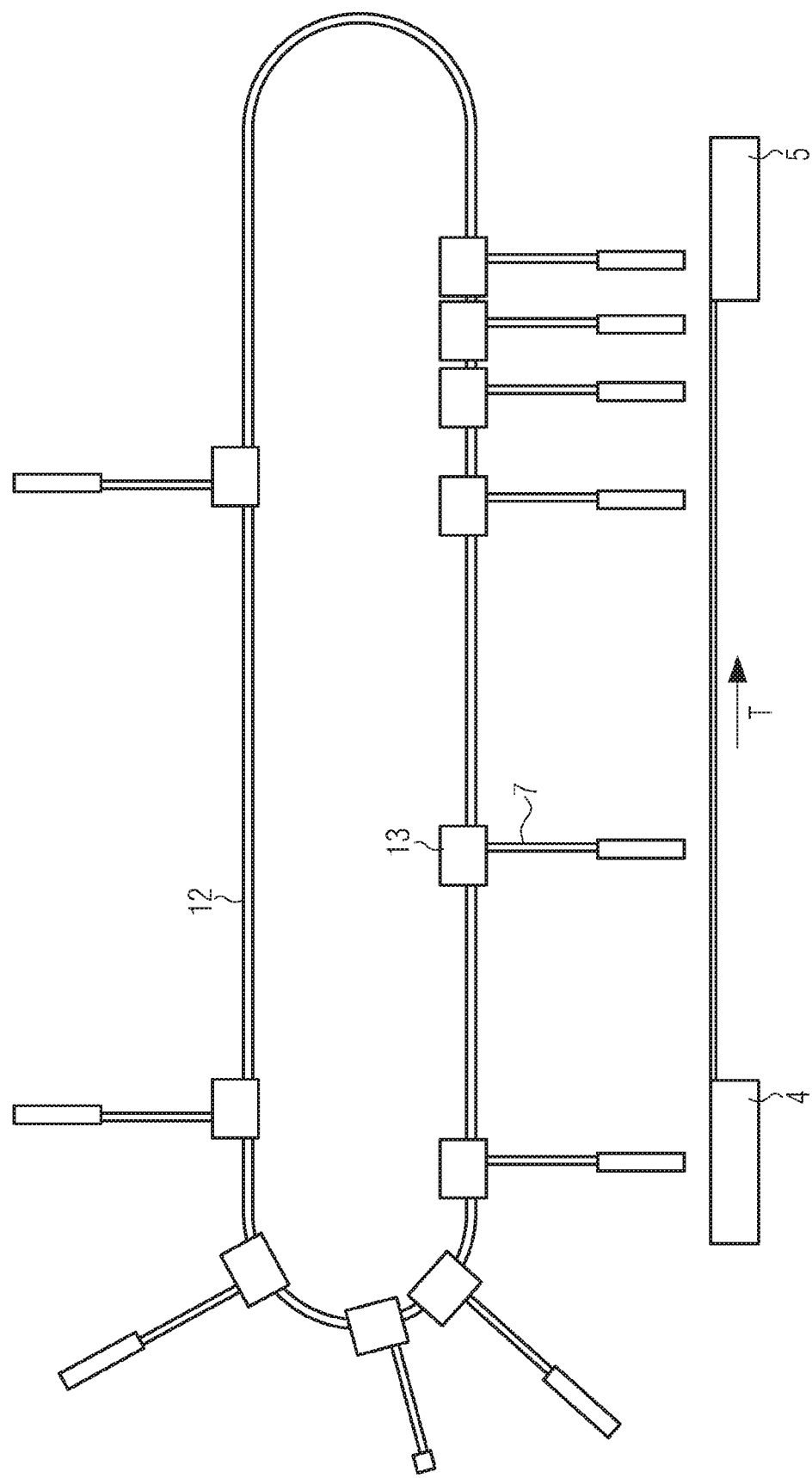
FIG. 2 shows a rough schematic side view of buffer device according to one embodiment of the present disclosure.

Row pushers 7 are advantageously driven by respective independent drives 13, as is apparent from FIG. 2.

Row pushers 7 can be driven, for example, via a so-called longitudinal stator drive 13 or disengageable transport chains, so that different row pushers 7 can be driven at different speeds such that the distance between adjacent row pushers can be varied and the speed can be adapted individually. The row pushers are formed e.g. as rotors of linear motors which are arranged in orbit 12 and in their upper region provided with permanent magnets. The permanent magnets and a corresponding linear motor then together represent a respective drive for a row pusher.

Not only the use of a longitudinal stator motor or disengageable chains is possible to drive row pushers 7 independently. A separate motor can also be provided for each row pusher 7 and move pusher 7, for example, via a gear and a rack in the closed orbit 12. The power supply of the motors can then be effected via a sliding contact or even inductively, not shown. Actuation of the motors is also effected via sliding contacts or via radio signals, etc.

In addition, a device (not shown) for position detection (e.g. optically) of row pushers 7 can be provided to control the motion of the row pushers (speed and/or movement distance) in dependence of their position and, for example, to adapt it, for example, to the motion of the feed and discharge devices 4, 5 and/or to adjust the buffer occupancy.

Due to the fact that the row pushers can be driven independently of one another, e.g. free spaces on the buffer area can easily be crossed. If the free space has been, for example, completely crossed, the motion of the respective row pusher can then be slowed down again and finally adapted to the outlet situation.

Due to the independently drivable row pushers and freely programmable drives of row pushers 7, all distances between the row pushers are adjustable by software, so that, for example, no conversion is necessary with a product change. In addition, it is possible to react to current conditions and to push out a number of piece goods as needed from buffer area 3. Since a row pusher 7 is arranged between each line of piece goods or group of piece goods, respectively, the number of piece goods pushed out can be controlled particularly well and adapted as needed. The device may comprise more than 15, optionally more than 30 row pushers.

As is apparent from FIGS. 1 and 2, orbit 12 of the row pushers is disposed above buffer area 3, where the row pushers are guided on both sides above buffer area 3 to provide sufficient stability. The row pushers are arranged freely movably on the circulating guide of orbit 12 and can therefore move along in the direction of transport T over buffer area 3, as can be seen from FIG. 2. At the end of buffer area 3, row pushers 7 then move away upwardly and return to inlet region 11 of feed device 4 in order to again take over the piece goods line by line and to push them onto the buffer area and over buffer area 3.

In this embodiment, buffer area 3 can be formed as a static buffer area. In principle, however, it is also possible that buffer area 3 itself is also configured as a conveyor belt which moves in the direction of transport T and is driven in a circulating manner. If buffer area 3 is configured as a movable conveyor belt, row pusher 7 can move at the same speed and thus support the piece goods. If the row pusher moves faster than the buffer area, then row pusher 7 can move the piece goods on the buffer area in the direction of transport due to the relative speed.

Disposed according to an embodiment upstream of inlet region 11 is a switch 8, which is configured such that the lane of piece goods supplied by feed device 4 is deflected such that a certain number of successive piece goods, which then form a line to be transferred, can be made to assume a sawtooth shape.

Figure 3:
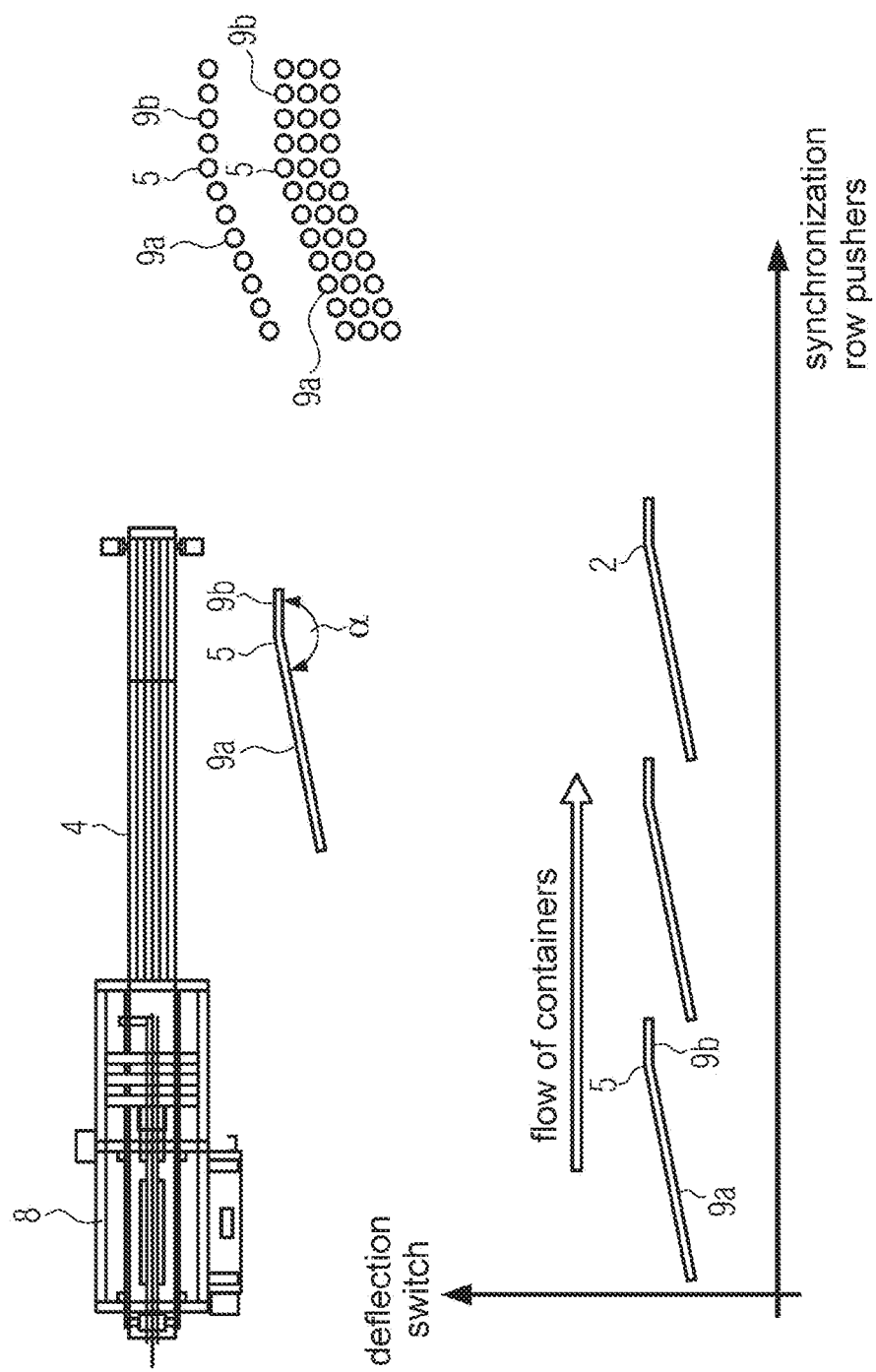
FIG. 3 shows a rough schematic top view onto the feed device with an upstream switch and the deflection of the piece goods by the switch as a function of time.

FIG. 3 illustrates the respective situation. Downstream of switch 8, the flow of piece goods shown in FIGS. 8A and 8B then has a sawtooth-like shape, as shown in FIG. 3. The piece goods can there enter either in one row or in several superimposed rows, so that a sawtooth-shaped group arises. The sawtooth-shaped section has a tip S as well as two sections 9a, 9b that converge at a flat angle $\alpha$. The angle $\alpha$ is, for example, in a range of 1.5° to 10°. Leading section 9b is optionally smaller than trailing section 9a. As is apparent from FIG. 3, sawtooth-shaped sections are produced by switch 8 and can be continuously transported one behind the other by feed device 4 into inlet region 11.

Figure 4:
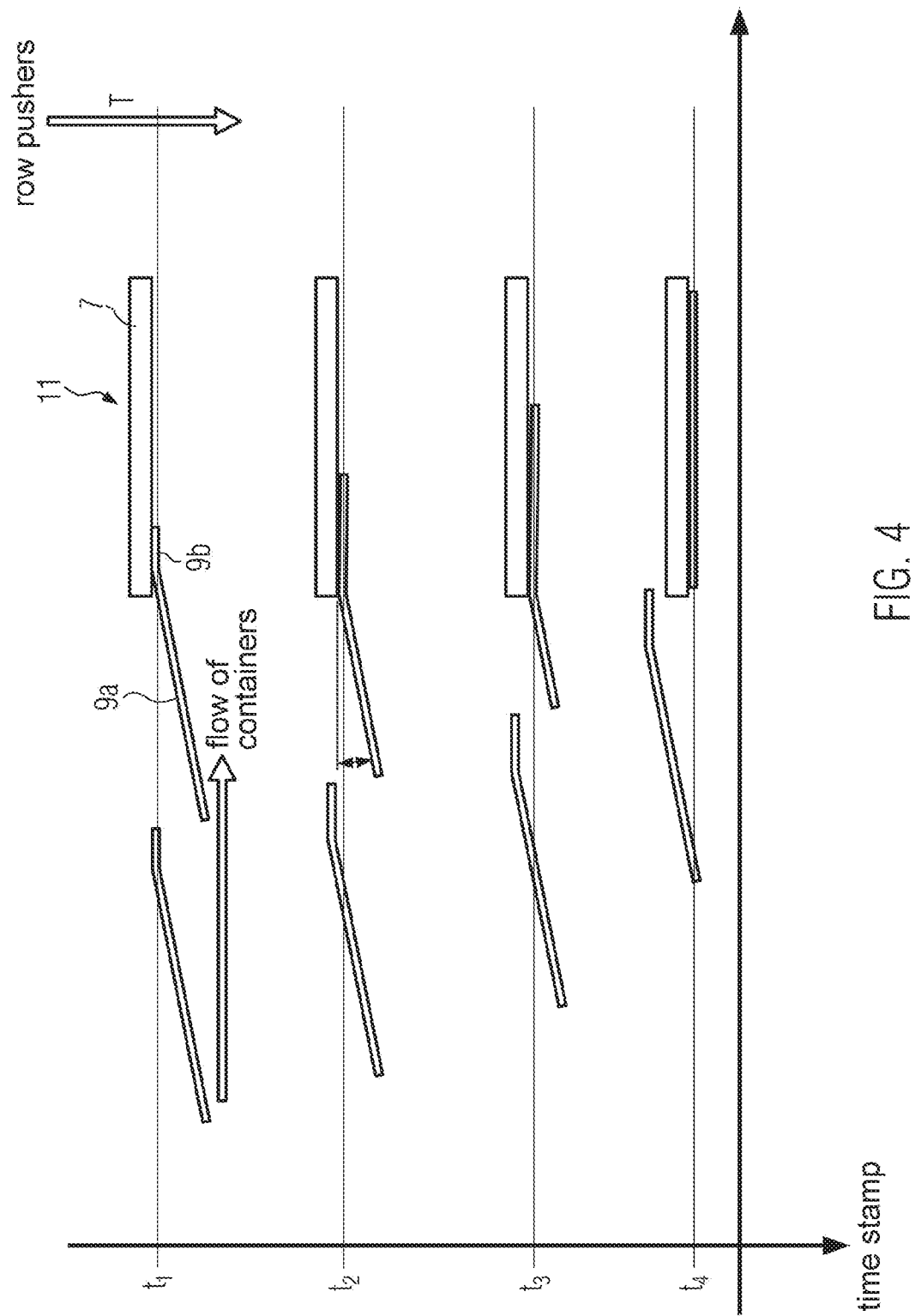
FIG. 4 shows a rough schematic path-time diagram showing the motion of the container flow and of the row pusher at different points in time.

FIG. 4 shows a path-time diagram showing the movement of the sawtooth-shaped sections at different points in time transverse to the direction of transport T into inlet region 11. At a point in time t1, a sawtooth-shaped section of piece goods is transported on feed device 4 into inlet region 11, and to such an extent that leading section 9b can be engaged by row pusher 7 moving in direction of transport T. Section 9b there extends substantially parallel to the front surface of row pusher 7. Row pusher 7 moves further in direction of transport T, while at the same time the sawtooth-shaped section is further conveyed in a direction perpendicular to the direction of transport and the piece goods of trailing section 9a extending at an acute angle $\gamma$ to the front surface of the row pusher move in front of row pusher 7. As a result of section 9a extending at an angle to the front surface, row pusher 7 can be moved on continuously until all of the piece goods are disposed in a line at point in time t4 in front of row pusher 7 and can now be pushed onto buffer area 3 as one line. At this point in time, the subsequent sawtooth-shaped section already moves in the direction of inlet region 11, so that the process can be repeated.

Figure 5:
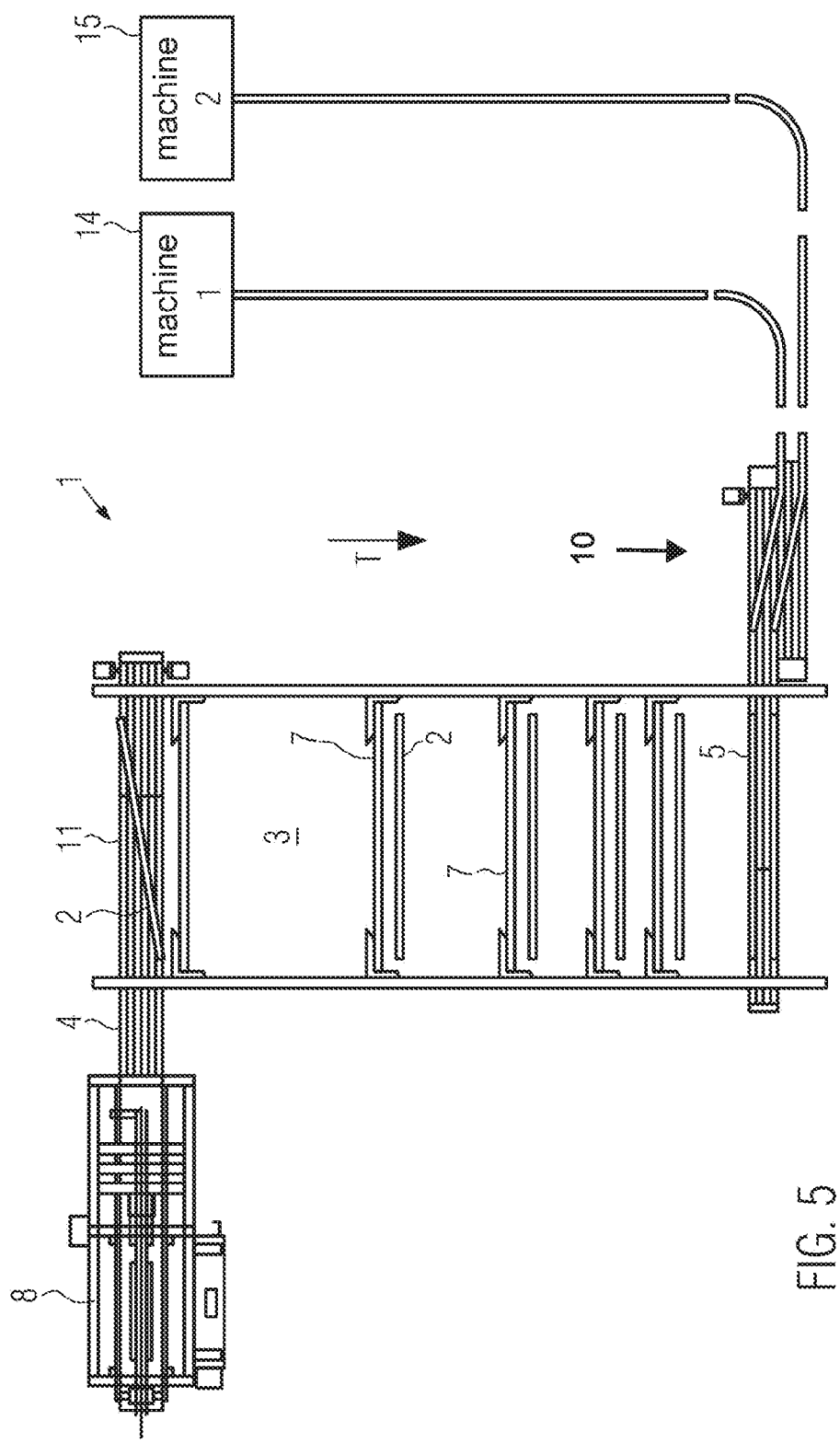
FIG. 5 shows a rough schematic view of an embodiment of the buffer device with a distribution device.

FIG. 5 shows the buffer device shown in FIG. 1 with a distribution device 10. The buffer device comprises a feed device 4 which supplies piece goods 2 in one lane and guides them in two lanes and leads them to two machines 14 and 15. For this purpose, a corresponding distribution device 10 can be provided to split the track. For this purpose, for example, two lines of piece goods can be pushed adjacently, for example, by two row pushers 7 onto outlet device 5 and are then split. FIG. 5 shows two machines and two discharge lanes, but several discharge lanes can also be created. Machines 14 and 15 can be package packers, packing machines, etc. If several lines are pushed onto the outlet device, then the discharge device must be stopped until all lines are placed on the discharge device.

It is also possible that discharge device 5 is formed from two parallel conveyor belts which are arranged adjacently at the outlet side end of the buffer area, so that the row pushers first push a line onto the last discharge belt and another line onto the conveyor belt facing buffer area 3, so that the piece goods can be discharged in two lanes.

Figure 6:
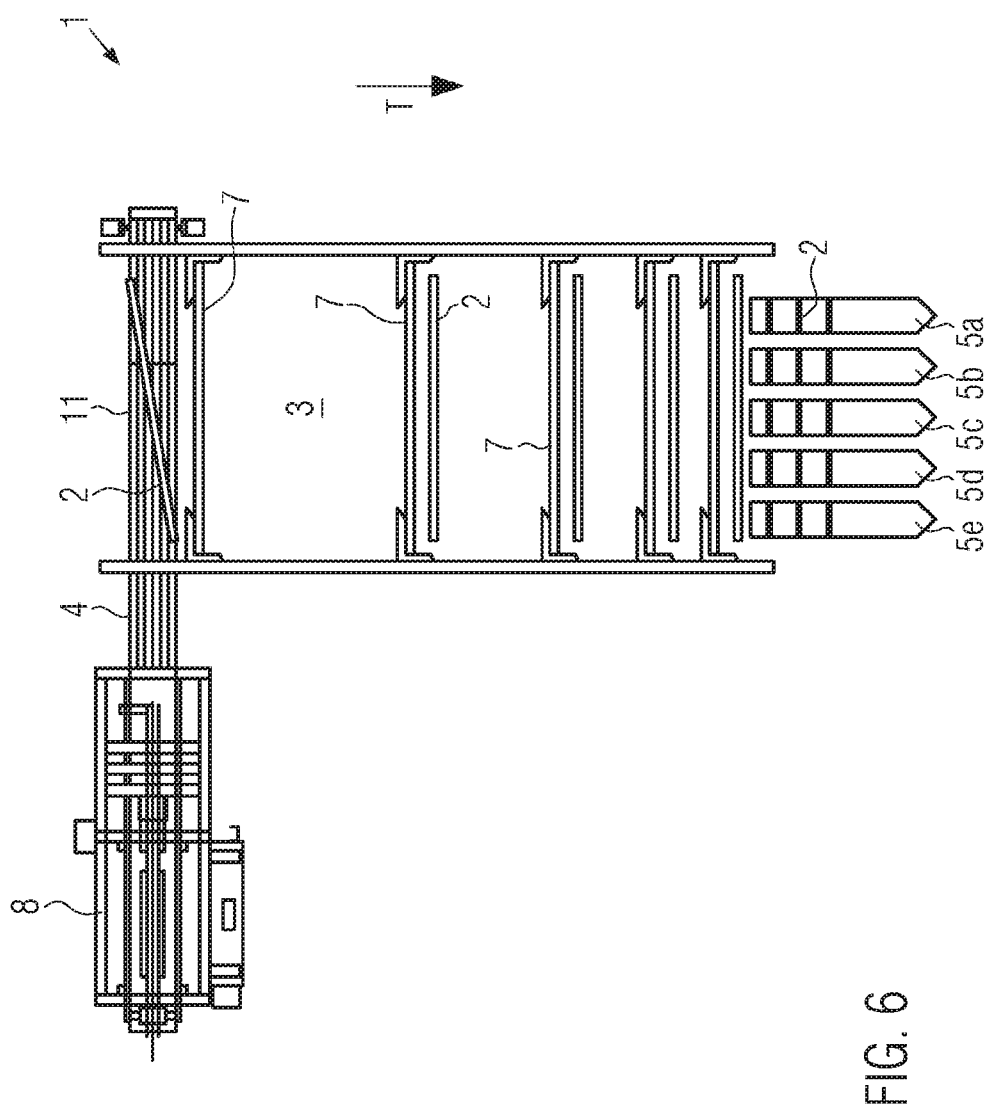
FIG. 6 shows a rough schematic top view onto a further embodiment.

FIG. 6 shows a further embodiment of the discharge device. For example, subsequent longitudinal transport in direction of transport T can there take place instead of the transverse transport at the outlet side end of the buffer area i.e. instead of the discharge device running perpendicular to the direction of transport T. For this purpose, a knife edge transition (Messerkanteniiberschub) can take place at the end of buffer area 3. A knife edge transition is understood to be a transition from one conveyor belt to the next conveyor belt with very small deflection wheels, so that the necessary dead plate (Totblech) for bridging the gap on the transport surface is minimized. The piece goods can there be rotated by 90° in that they are once pushed transversely on the inlet side and this transverse orientation is not changed when they are transported away.

Figure 7:
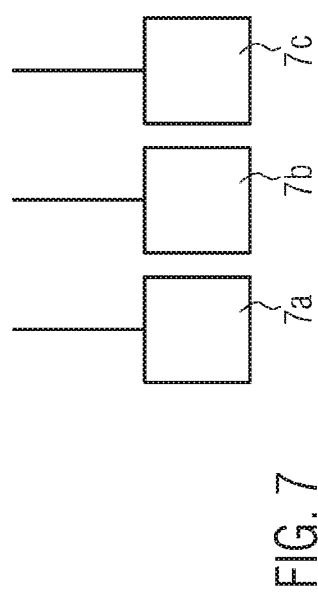
FIG. 7 shows an embodiment of a row pusher with several modules.

In addition, instead of the end-to-end row pusher 7 shown above, it is there also possible to use a row pusher which comprises several modular segments 7a, b, c, as shown in FIG. 7, which may each likewise be drivable independently and can move independently at different speeds in the direction of transport T. Individual piece goods or a certain number thereof can then be pushed out from the line array. In addition, package layers or large containers for display packages can be prepared. The piece goods can be clocked out having gaps, in particular where an interposed transverse conveyor is used. Repackaging packages or packets is also possible.

The method according to the disclosure is described below in more detail with reference to FIGS. 1 to 5. For buffering piece goods, piece goods 2, such as containers or bottles or packages, are first transported in by a feed device 4. The piece goods 2 are transported in in a direction which extends substantially perpendicular to direction T. As described above, sawtooth-shaped sections are created upstream of inlet region 11 and are transported in succession, as shown in FIG. 3, in the direction of inlet region 11 of feed device 4. As previously explained in more detail in the context of FIG. 4, while sawtooth-shaped section 9b moves into inlet region 11, a circulating row pusher 11 approaches and engages this section 9b, where the piece goods gradually move in front of row pusher 7 which moves in direction of transport T until all piece goods of one line are at point in time 14 in front of row pusher 7 which can then push the line onto buffer area 3. As is apparent from FIG. 4, subsequent row pushers 7 can push the sawtooth-shaped sections line by line onto the buffer area. The motion of row pusher 7 is matched to the inlet speed of the piece goods in inlet region 11. Row pushers 7 move, e.g. push the piece goods over buffer area 3 or support them when the buffer area itself moves in direction of transport.

Since row pushers 7 are driven independently, free spaces at the center of buffer area 3 can easily be crossed. If, for example, the free space has been completely bridged, the movement is slowed down again and adapted to the outlet situation. This means that different row pushers can have different speeds and also the speed of a row pusher 7 varies during one circulation in orbit 12. At the end of buffer area 3, which faces discharge device 5, a number of lines as needed can then be moved from the table onto the discharge belt, where, for example, two lines are pushed onto discharge device 5 by two successive row pushers 7, as shown in FIG. 5, the track is then split by a distribution device 10 and the piece goods are supplied to various machines 14 and 15. A simple distribution from one lane of piece goods onto two lanes of piece goods is then possible. In the event of failure of a machine, only one lane of piece goods can then be pushed out to supply only one downstream machine. The other machine can then be shut down and the surplus piece goods can be buffered by the buffer device, i.e. first dwell on the buffer area. When pushing up the lines, care must be taken that the discharge device, i.e. presently outlet belt 5, is stopped briefly when the row pusher pushes over, or a sawtooth pattern from buffer 3 is likewise moved. To generate a sawtooth pattern at the outlet belt, row pusher 7 is moved slowly with a lane of piece goods over several outlet belts. The outlet belts can have different speeds and must be juxtaposed. When the row pusher with the lane of piece goods moves over the first outlet belt, the first containers are withdrawn or conveyed away from the outlet belt. In this case, the row pusher moves on and pushes the reducing lane of piece goods over the adjacently arranged outlet belts. These outlet belts thus discharge the containers in a sawtooth pattern, which is similar to the pattern with which the containers were engaged by the row pushers. This variant is not shown in the drawing.

The device according to the disclosure also makes it possible that a lane of piece goods is extended for a service outfeed.

In principle, it is also possible that a 90° rotation of the piece goods is effected by a conveyor disposed downstream in e direction of transport T. In one embodiment of the row pusher with row pusher modules 7a, b, c, as shown in FIG. 7, the line of piece goods can again be split.

The buffer device according to the disclosure enables responding individually to a wide variety of requirements in a line. In addition, the advantage of a small footprint and simpler sequences of motion arises.

FIGS. 1-8A/8B show the relative positioning of various components of the buffer device. If shown directly contacting each other, or directly coupled, then such components may be referred to as directly contacting or directly coupled, respectively, at least in one example. Similarly, components shown contiguous or adjacent to one another may be contiguous or adjacent to each other, respectively, at least in one example. As an example, components lying in face-sharing contact with each other may be referred to as in face-sharing contact or physically contacting one another. As another example, elements positioned apart from each other with only a space there-between and no other components may be referred to as such, in at least one example.

As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention claimed is:
1. A buffer device for piece goods with
a buffer area,
a feed device for supplying the piece goods to the buffer area, and
a discharge device for discharging the piece goods from the buffer area,
wherein
several circulating, independently drivable row pushers are configured to transport the piece goods in a direction of transport through the buffer area, and
the buffer device comprises a deflection device upstream of an inlet region of the feed device such that a certain number of successive piece goods are made to assume a sawtooth shape.

2. The buffer device according to claim 1, wherein the row pushers are moved by several independent drives.

3. The buffer device according to claim 1, wherein several successive row pushers push the piece goods in the direction of transport from an end of the buffer area facing the feed device to an end of the buffer area facing the discharge device, where more than 10 circulating row pushers are provided.

4. The buffer device according to claim 1, wherein an orbit of the row pushers is arranged above the buffer area.

5. The buffer device according to claim 1, wherein a row pusher has a width which corresponds substantially to a width of the buffer area and the row pushers are guided on both sides.

6. The buffer device according to claim 1, wherein the row pusher comprises several pusher modules which are arranged in a direction transverse to the direction of transport and which are drivable independently.

7. A method for buffering piece goods with a buffer device, wherein
the piece goods are conveyed via a feed device to a buffer area,
are transported by independently driven circulating row pushers in a direction of transport through the buffer area to a discharge device,
are transported away by the discharge device, and
the buffer device comprises a deflection device upstream of an inlet region of the feed device such that a certain number of successive piece goods are made to assume a sawtooth shape.

8. The method according to claim 7, wherein a certain number of piece goods is pushed via the row pusher line by line onto the buffer area.

9. The method according to claim 7, wherein the row pushers are at least temporarily driven at different speeds, where the speed of a row pusher when circulating around its orbit varies.

10. The method according to claim 7, wherein the sawtooth shape has a tip and two sections converging at a flat angle, and
wherein, when the piece goods enter the inlet area of the feed device adjoining the buffer area, a row pusher moves in the direction of transport and first engages with a leading portion of the sawtooth-shaped piece goods which extends substantially parallel to a front area of the row pusher and pushes it in the direction of transport and moves further in the direction of transport, while the piece goods of a trailing portion extending at an acute angle to the front area of the row pusher gradually move in front of the row pusher until the piece goods are located in front of the row pusher and are pushed onto the buffer area.

11. The method according to claim 7, wherein the row pushers circulate in an orbit above the buffer area and are guided on both sides.

12. The method according to claim 7, wherein the piece goods of the buffer area are supplied in one lane and a distribution device splits the piece goods into two or more lanes for discharging them to two or more downstream machines.

13. The method according to claim 7, wherein two or more lines arranged in parallel in the direction of transport are pushed by two or more row pushers onto the discharge device and then split by a distribution device into two or more lanes of piece goods, or only one line is pushed by the row pusher onto the discharge device and one lane of piece goods is discharged.

14. The buffer device according to claim 1, wherein the buffer device is for containers, bottles or packages.

15. The buffer device according to claim 2, wherein the independent drives are longitudinal stator drives.

16. The buffer device according to claim 1, wherein the deflection device is a switch which deflects the lane of piece goods supplied by the feed device.

17. The method according to claim 7, wherein the piece goods are containers, bottles or packages.

* * * * *